(12) United States Patent
Byun

(10) Patent No.: US 12,142,790 B2
(45) Date of Patent: Nov. 12, 2024

(54) ELECTRODE ASSEMBLY AND SECONDARY BATTERY COMPRISING THE SAME

(71) Applicant: Samsung SDI Co., Ltd., Yongin-si (KR)

(72) Inventor: In Seop Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 200 days.

(21) Appl. No.: 17/445,291

(22) Filed: Aug. 17, 2021

(65) Prior Publication Data
US 2022/0059905 A1   Feb. 24, 2022

(30) Foreign Application Priority Data
Aug. 20, 2020  (KR) .................. 10-2020-0104607

(51) Int. Cl.
*H01M 50/46* (2021.01)
*H01M 4/13* (2010.01)
(Continued)

(52) U.S. Cl.
CPC ............. *H01M 50/46* (2021.01); *H01M 4/13* (2013.01); *H01M 10/052* (2013.01);
(Continued)

(58) Field of Classification Search
CPC .. H01M 50/46; H01M 50/531; H01M 50/105; H01M 4/13; H01M 10/052; H01M 10/0587
See application file for complete search history.

(56) References Cited

U.S. PATENT DOCUMENTS 7,033,697 B2   4/2006  Park et al.
7,931,980 B2   4/2011  Kwak et al.
(Continued)

FOREIGN PATENT DOCUMENTS

CN          1423358 A      6/2003
CN        101615694 A     12/2009
(Continued)

OTHER PUBLICATIONS

Chinese Office Action dated Jan. 15, 2024, including Search Report dated Jan. 11, 2024, for corresponding Chinese Application No. 202110959212.2, including English translation, 19 pages.

*Primary Examiner* — Jonathan G Jelsma
*Assistant Examiner* — Niara Trant
(74) *Attorney, Agent, or Firm* — Lewis Roca Rothgerber Christie LLP

(57) ABSTRACT

An electrode assembly includes: a first electrode plate having a first electrode uncoated portion spaced apart from both ends in a longitudinal direction thereof, and a base tab on one surface of the first electrode uncoated portion; a second electrode plate having a second electrode uncoated portion spaced apart from both ends in a longitudinal direction thereof, and a base tab on one surface of the second electrode uncoated portion; a separator between the first electrode plate and the second electrode plate; a tab cover tape attached to the one surfaces of the first electrode uncoated portion and the second electrode uncoated portion; an uncoated portion cover tape attached to each of the other surfaces of the first electrode uncoated portion and the second electrode uncoated portion; and an insulating tape attached onto the second electrode plate at a position corresponding to the first electrode uncoated portion.

18 Claims, 9 Drawing Sheets

(51) Int. Cl.
  *H01M 10/052* (2010.01)
  *H01M 10/0587* (2010.01)
  *H01M 50/105* (2021.01)
  *H01M 50/531* (2021.01)

(52) U.S. Cl.
  CPC ..... *H01M 10/0587* (2013.01); *H01M 50/105* (2021.01); *H01M 50/531* (2021.01)

(56) References Cited

U.S. PATENT DOCUMENTS

| | | |
|---|---|---|
| 9,048,489 B2 | 6/2015 | Oh et al. |
| 10,505,218 B2 | 12/2019 | Ishikawa et al. |
| 2003/0099880 A1 | 5/2003 | Park et al. |
| 2004/0161662 A1* | 8/2004 | Kim ........................ H01M 4/70 429/211 |
| 2006/0051662 A1 | 3/2006 | Kwak et al. |
| 2010/0035144 A1* | 2/2010 | Oh ...................... H01M 50/557 429/211 |
| 2011/0014509 A1* | 1/2011 | Kim ................... H01M 50/489 429/246 |
| 2017/0309951 A1* | 10/2017 | Ishikawa ............. H01M 50/586 |
| 2019/0097259 A1 | 3/2019 | Guo et al. |
| 2019/0198851 A1 | 6/2019 | Woo et al. |

FOREIGN PATENT DOCUMENTS

| | | |
|---|---|---|
| CN | 101958427 A | 1/2011 |
| CN | 107112493 A | 8/2017 |
| KR | 10-0449757 B1 | 9/2004 |
| KR | 10-0635761 B1 | 10/2006 |
| KR | 10-2018-0028837 A | 3/2018 |

\* cited by examiner

ELECTRODE ASSEMBLY AND SECONDARY BATTERY COMPRISING THE SAME

CROSS-REFERENCE TO RELATED APPLICATION

This application claims priority to and the benefit of Korean Patent Application No. 10-2020-0104607, filed on Aug. 20, 2020, in the Korean Intellectual Property Office, the disclosure of which is incorporated herein by reference in its entirety.

BACKGROUND

1. Field

Embodiments of the present disclosure relate to an electrode assembly and a secondary battery including the same.

2. Description of the Related Art

A secondary battery includes: an electrode assembly, which includes a positive electrode, a negative electrode, and a separator disposed between the positive electrode and the negative electrode; and a cell containing an electrolyte impregnated into the electrode assembly.

In general, the electrode assembly includes a negative electrode plate in which a negative electrode active base layer is formed on a thin-film type (e.g., kind) electrode collector and a positive electrode plate in which a positive electrode active base layer is formed on a thin-film type (e.g., kind) electrode collector. An uncoated portion, on which the respective active base layer is not formed, is provided with each of the negative electrode plate and the positive electrode plate, and a negative electrode base tab and a positive electrode base tab are formed on the respective uncoated portion. The negative electrode base tab and the positive electrode base tab may be formed adjacent to an edge in a longitudinal direction of the respective negative electrode plate and the positive electrode plate or may be formed at a central portion thereof.

When charge and discharge of the secondary battery is repeated, positive ions generated from the positive electrode plate may be deposited on the negative electrode plate and may permeate to the uncoated portion, or the positive ions may be stacked (e.g., may grow into lithium dendrite) to punch (e.g., puncture or penetrate through) the separator, thereby generating a short-circuit between the positive electrode and the negative electrode.

The above-described information disclosed in the background technology of the present disclosure is merely intended to improve understanding of the background of the present disclosure and thus may include information that does not form prior art.

SUMMARY

Aspects according to embodiments of the present disclosure are directed toward an electrode assembly capable of reducing deposition of positive ions on the electrode assembly to which a center tab is attached and a secondary battery including the same.

According to one or more embodiments, an electrode assembly includes: a first electrode plate having a first electrode uncoated portion spaced apart from both ends in a longitudinal direction thereof, the first electrode uncoated portion has a first surface and a second surface facing away from the first surface, and a base tab on the first surface of the first electrode uncoated portion; a second electrode plate having a second electrode uncoated portion spaced apart from both ends in a longitudinal direction thereof, the second electrode uncoated portion has a first surface and a second surface facing away from the first surface, and a base tab on the first surface of the second electrode uncoated portion; a separator between the first electrode plate and the second electrode plate; a tab cover tape attached to the first surface of each of the first electrode uncoated portion and the second electrode uncoated portion; an uncoated portion cover tape attached to the second surface of each of the first electrode uncoated portion and the second electrode uncoated portion; and an insulating tape attached onto the second electrode plate at a position corresponding to the first electrode uncoated portion.

The first electrode plate may be a negative electrode, and the second electrode plate may be a positive electrode.

The insulating tape may include a first insulating tape attached at a position corresponding to the second surface of the first electrode uncoated portion and a second insulating tape attached at a position corresponding to the first surface of the first electrode uncoated portion, on which the base tab is formed.

The insulating tape may be greater in size than the first electrode uncoated portion.

The insulating tape may be attached at a position corresponding to the second surface of the first electrode uncoated portion, and the tab cover tape attached to the first surface of the second electrode uncoated portion may extend over and may be attached at a position corresponding to the one surface of the first electrode uncoated portion, on which the base tab is formed.

The insulating tape may include a first insulating tape attached at a position corresponding to the other surface of the first electrode uncoated portion, a second insulating tape attached at a position corresponding to the first surface of the first electrode uncoated portion, on which the base tab is formed, and a third insulating tape attached to cover the second insulating tape and the tab cover tape attached to the first surface of the second electrode uncoated portion.

According to another embodiment, a secondary battery includes: an electrode assembly electrode assembly including: a first electrode plate having a first electrode uncoated portion spaced apart from both ends in a longitudinal direction thereof, the first electrode uncoated portion has a first surface and a second surface facing away from the first surface, and a base tab on the first surface of the first electrode uncoated portion; a second electrode plate having a second electrode uncoated portion spaced apart from both ends in a longitudinal direction thereof, the second electrode uncoated portion has a first surface and a second surface facing away from the first surface, and a base tab on the first surface of the second electrode uncoated portion; a separator between the first electrode plate and the second electrode plate; a tab cover tape attached to the first surface of each of the first electrode uncoated portion and the second electrode uncoated portion; an uncoated portion cover tape attached to the second surface of each of the first electrode uncoated portion and the second electrode uncoated portion; and an insulating tape attached onto the second electrode plate at a position corresponding to the first electrode uncoated portion; and a pouch or pocket kind case configured to accommodate and seal the electrode assembly together with an electrolyte.

The first electrode plate may be a negative electrode, and the second electrode plate may be a positive electrode.

The insulating tape may include a first insulating tape attached at a position corresponding to the second surface of the first electrode uncoated portion and a second insulating tape attached at a position corresponding to the first surface of the first electrode uncoated portion, on which the base tab is formed.

The insulating tape may be greater in size than the first electrode uncoated portion.

The insulating tape may be attached at a position corresponding to the second surface of the first electrode uncoated portion, and the tab cover tape attached to the first surface of the second electrode uncoated portion may extend over and be attached at a position corresponding to the first surface of the first electrode uncoated portion, on which the base tab is formed.

The insulating tape may include a first insulating tape attached at a position corresponding to the second surface of the first electrode uncoated portion, a second insulating tape attached at a position corresponding to the first surface of the first electrode uncoated portion, on which the base tab is formed, and a third insulating tape attached to cover the second insulating tape and the tab cover tape attached to the first surface of the second electrode uncoated portion.

BRIEF DESCRIPTION OF THE DRAWINGS

The accompanying drawings are included to provide a further understanding of the present disclosure, and are incorporated in and constitute a part of this specification. The drawings illustrate example embodiments of the present disclosure and, together with the description, serve to explain principles of the present disclosure. In the drawings.

DETAILED DESCRIPTION

Figure 1:
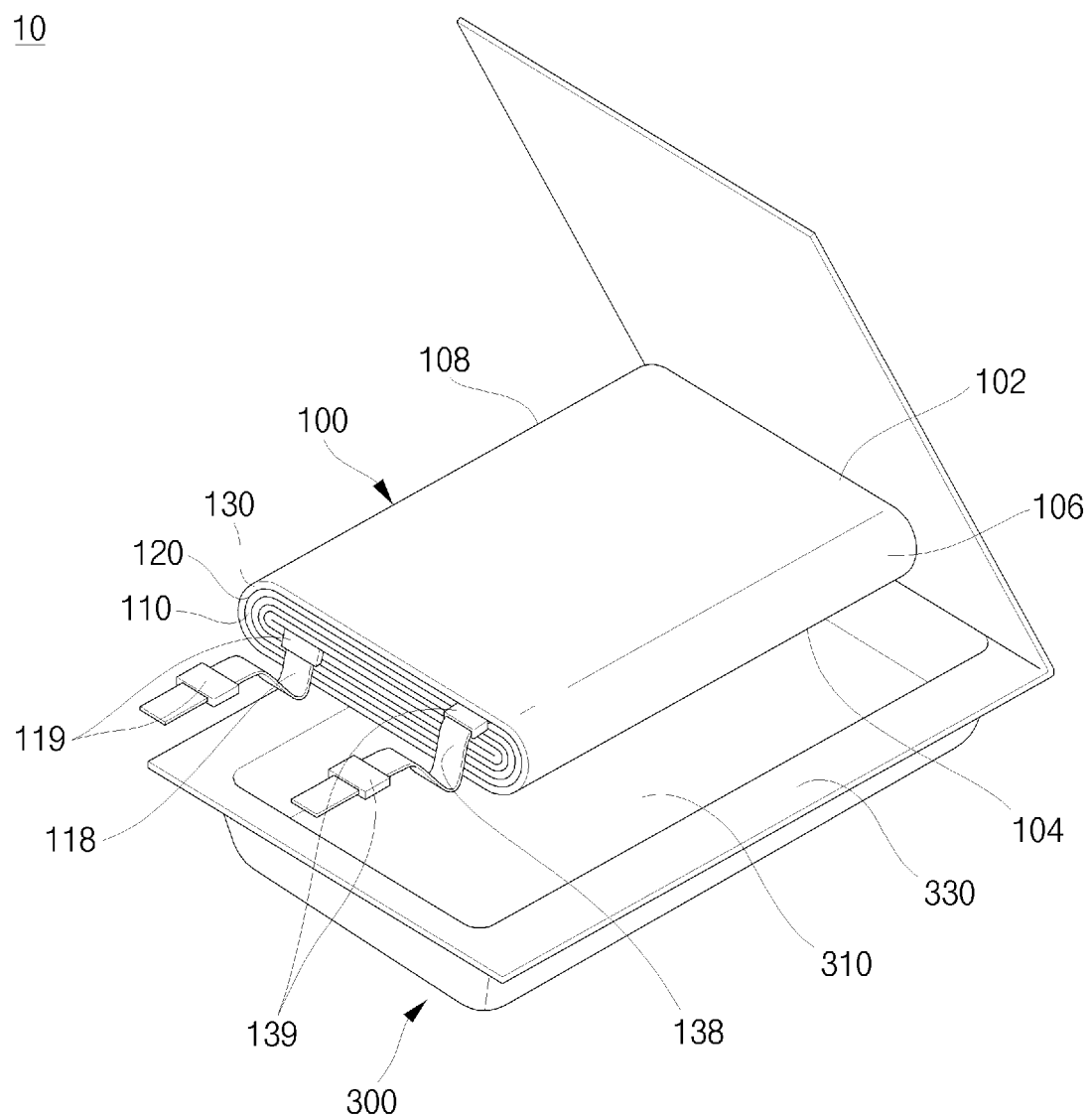
FIG. 1 is an exploded perspective view illustrating a secondary battery according to a first embodiment of the present disclosure.

The subject matter of the present disclosure may be embodied in many different forms and should not be construed as being limited to the embodiments set forth herein, and rather, these embodiments are provided so that those skilled in the art thoroughly understand the present disclosure. These embodiments are provided so that this disclosure will be thorough and complete, and will fully convey the scope of the present disclosure to those skilled in the art.

Also, in the figures, a thickness or dimension of each of the layers may be exaggerated for clarity of illustration, and like reference numerals in the drawings denote like elements. As used herein, the term "and/or" includes any and all combinations of one or more of the associated listed items. In this specification, it will also be understood that when a member A is referred to as being connected to a member B, the member A can be directly connected to the member B or indirectly connected to the member B with a member C therebetween.

The terms as used herein are for illustrative purposes of the present disclosure only and should not be construed to limit the meaning or the scope of the present disclosure. As used in this specification, a singular form may, unless the context clearly indicates otherwise, include a plural form. Also, the expressions "comprise" and/or "include" as used in this specification specify the presence of stated shapes, numbers, steps, operations, members, elements, and/or groups, but do not preclude the presence or addition of one or more other shapes, numbers, steps, operations, members, elements, and/or groups. The term "and/or" as used herein includes any and all combinations of one or more of the associated listed items.

It will be understood that, although the terms "first," "second," etc., may be used herein to describe various members, components, regions, layers and/or sections, these members, components, regions, layers and/or sections should not be limited by these terms. These terms are only used to distinguish one member, component, region, layer and/or section from another. Thus, a first member, a first component, a first region, a first layer and/or a first section discussed below could be termed a second member, a second component, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. The spatially relative terms are intended to help understanding of the present disclosure according to various process states or usage stages of the present disclosure, but do not limit the scope of the present disclosure. For example, if the device in the figures is turned over, elements described as "beneath" or "below" other elements or features would then be oriented "above" or "over" the other elements or features. Thus, the example term "beneath" can encompass both an orientation of "above" and "below".

Hereinafter, an electrode assembly and a secondary battery according to embodiments of the present disclosure will be described in more detail with reference to the accompanying drawings.

Figure 2:
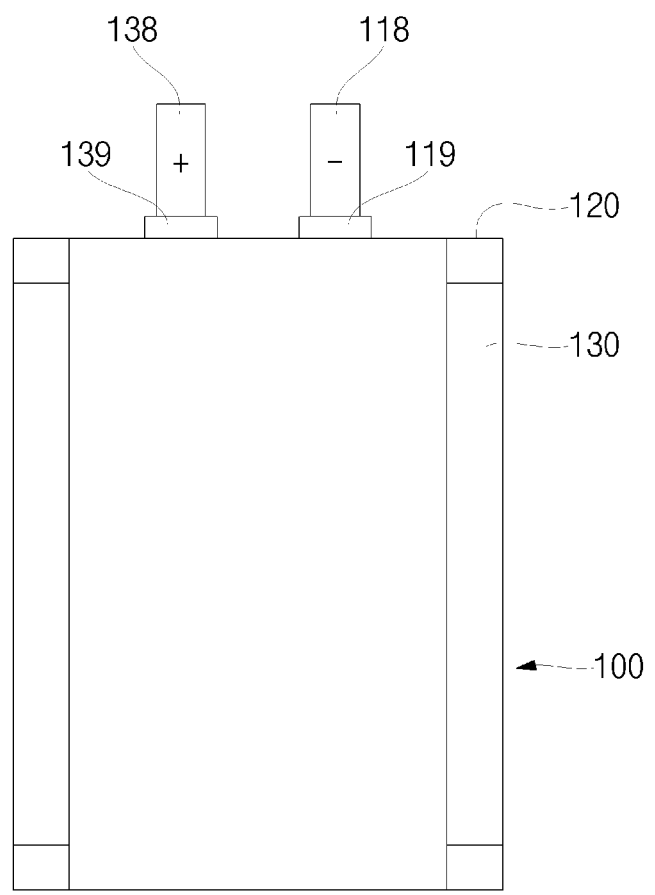
FIG. 2 is a plan view illustrating a portion of the secondary battery of FIG. 1.
Figure 3:
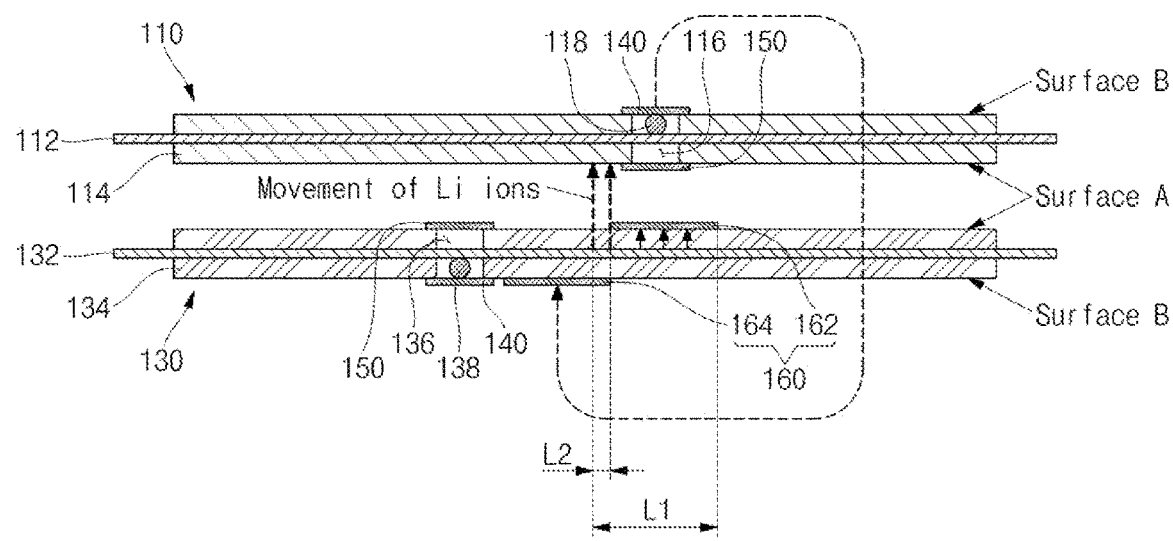
FIG. 3 is a schematic cross-sectional view of an electrode assembly of FIG. 1.

FIG. 1 is an exploded perspective view illustrating a secondary battery according to a first embodiment of the present disclosure. FIG. 2 is a plan view illustrating a portion of the secondary battery of FIG. 1. FIG. 3 is a schematic cross-sectional view of an electrode assembly of FIG. 1.

Referring to FIG. 1, a secondary battery 10 according to the first embodiment of the present disclosure may include an electrode assembly 100 and a pouch-type (e.g., kind) case 300 for accommodating the electrode assembly 100.

As illustrated in FIGS. 1 to 3, the electrode assembly 100 may be formed by winding or stacking a laminate of a first electrode plate 110, a separator 120, and a second electrode plate 130. Here, the first electrode plate 110 may be a negative electrode, and the second electrode plate 130 may be a positive electrode, but the present disclosure is not limited thereto and the contrary may be true. The electrode assembly 100 may be (e.g., typically) referred to as a jelly roll. In the present disclosure, the wound-type (e.g., kind) electrode assembly 100 will be described as an example.

The first electrode plate 110 may be formed by applying a first electrode active material 114 such as graphite and/or carbon to a first electrode collector 112 made of metal foil such as copper, a copper alloy, nickel, and/or a nickel alloy. A first electrode uncoated portion 116 on which the first electrode active material 114 is not applied may be in (e.g., formed on) a partial area of the first electrode collector 112. A first electrode base tab 118 may be formed on the first electrode uncoated portion 116 in a width direction of the first electrode collector 112. Because the first electrode uncoated portion 116 is formed at a central portion or a portion adjacent thereto in a longitudinal direction of the first electrode collector 112, the first electrode base tab 118 may be referred to as a center tab. The first electrode base tab 118 extends to the outside of the first electrode collector 112 (an upward direction in FIG. 2). The first electrode base tab 118 provides (e.g., is) a passage of current flow between the first electrode plate 110 and a terminal of the case 300. As an insulating member 119 is attached to the first electrode base tab 118, a short-circuit between the first electrode base tab 118 and the case 300 may be prevented or substantially prevented.

As illustrated in FIGS. 1 to 3, the second electrode plate 130 may be formed by applying a second electrode active material 134 such as a transition metal oxide to a second electrode collector 132 made of metal foil such as aluminum and/or an aluminum alloy. A second electrode uncoated portion 136 on which the second electrode active material 134 is not applied may be in (e.g., formed on) a partial area of the second electrode collector 132. A second electrode base tab 138 may be formed on the second electrode uncoated portion 136 in a width direction of the second electrode collector 132. Because the second electrode uncoated portion 136 is formed at a central portion or a portion adjacent thereto in a longitudinal direction of the second electrode collector 132, the second electrode base tab 138 may be referred to as a center tab. The second electrode base tab 138 extends to the outside of the second electrode collector 132 (an upward direction in FIG. 2). Here, the second electrode base tab 138 is disposed in an area that is not overlapped with the first electrode base tab 118. The second electrode base tab 138 provides (e.g., is) a passage of current flow between the second electrode plate 130 and the terminal of the case 300. As an insulating member 139 is attached to the second electrode base tab 138, a short-circuit between the second electrode base tab 138 and the case 300 may be prevented or substantially prevented.

As illustrated in FIGS. 1 to 3, the separator 120 is disposed between the first electrode plate 110 and the second electrode plate 130 to prevent or substantially prevent a short-circuit between the first electrode plate 110 and the second electrode plate 130. To this end, the separator 120 may be greater in size than each of the first electrode plate 110 and the second electrode plate 130. In some embodiments, the separator 120 may be made of polyethylene, polypropylene, and/or a composite film of polyethylene and polypropylene, however, the present disclosure is not limited thereto.

The electrode assembly 100 having the above-described structure is wound together with the electrolyte and accommodated in the case 300 as shown in FIG. 1.

As illustrated in FIG. 1, the case 300, which is a pouch or pocket type (e.g., kind) case, may be referred to as a laminate exterior material, a pouch, a pouch exterior material, or a pouch case. The case 300 may be formed by bending a plate-shaped exterior material to face each other and forming a recess 310 in which the electrode assembly 100 is accommodated through a process such as press and/or drawing. For example, the case 300 may be formed by bending the plate-shaped exterior material to face each other to define the recess 310. A sealing part 330 is formed on an outer circumference of the recess 310, and the sealing part 330 is sealed by thermal bonding in a state in which the electrode assembly 100 is accommodated in the recess 310.

Hereinafter, the above-described main structure of the electrode assembly will be described in more detail, where a vertical direction will be defined by a thickness direction of the electrode plate with respect to FIG. 3, a horizontal direction will be defined by a longitudinal direction of the electrode plate, and a vertical direction will be defined by a width direction of the electrode plate with respect to FIG. 4A.

Figure 4A:
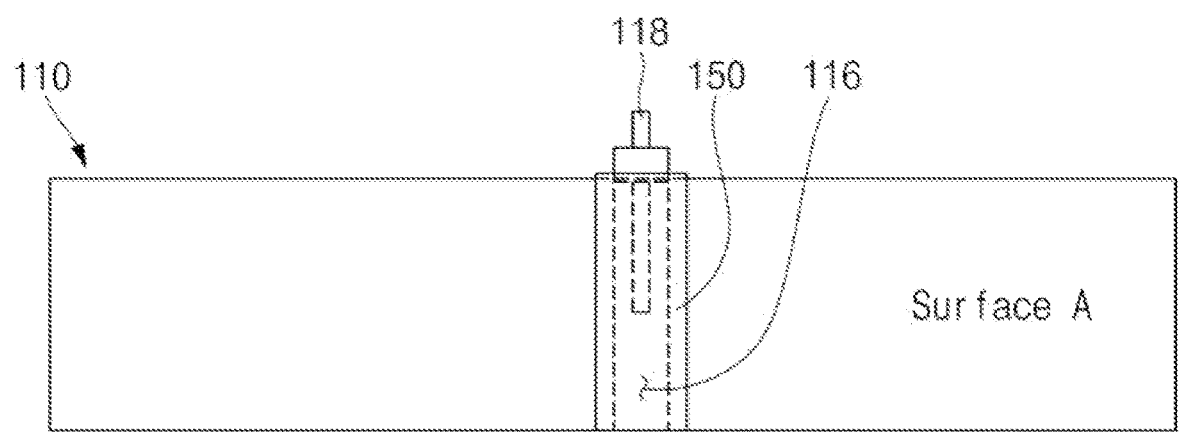
FIG. 4A is a plan view illustrating a surface A of a main component of the electrode assembly of FIG. 3.
Figure 4A:
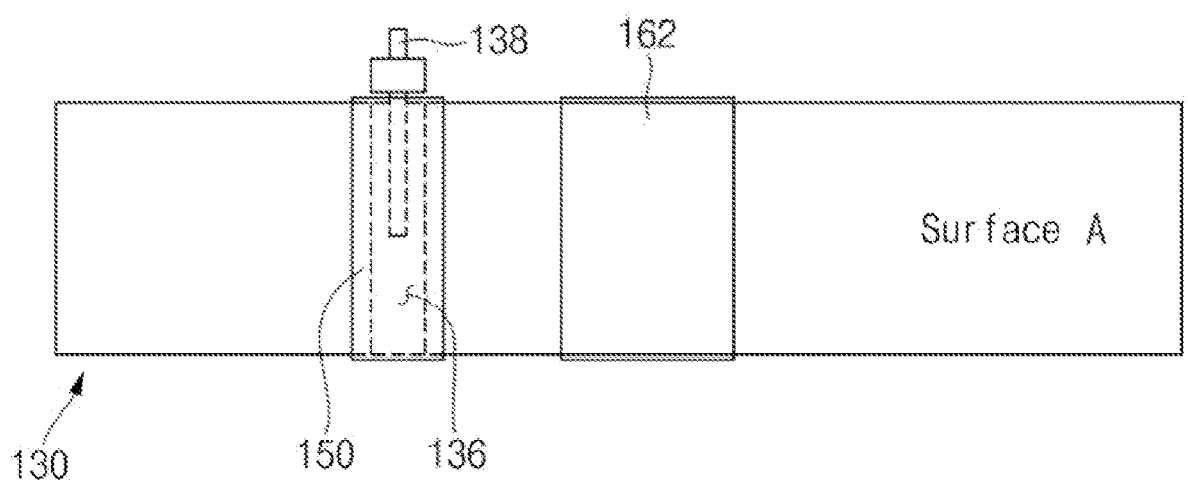
Figure 4B:
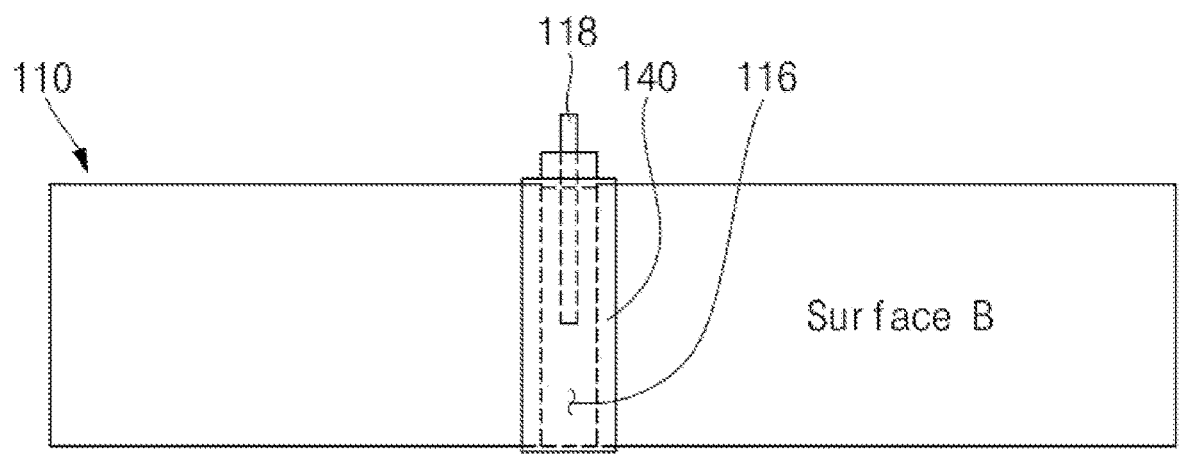
FIG. 4B is a plan view illustrating a surface B of a main component of the electrode assembly of FIG. 3.
Figure 4B:
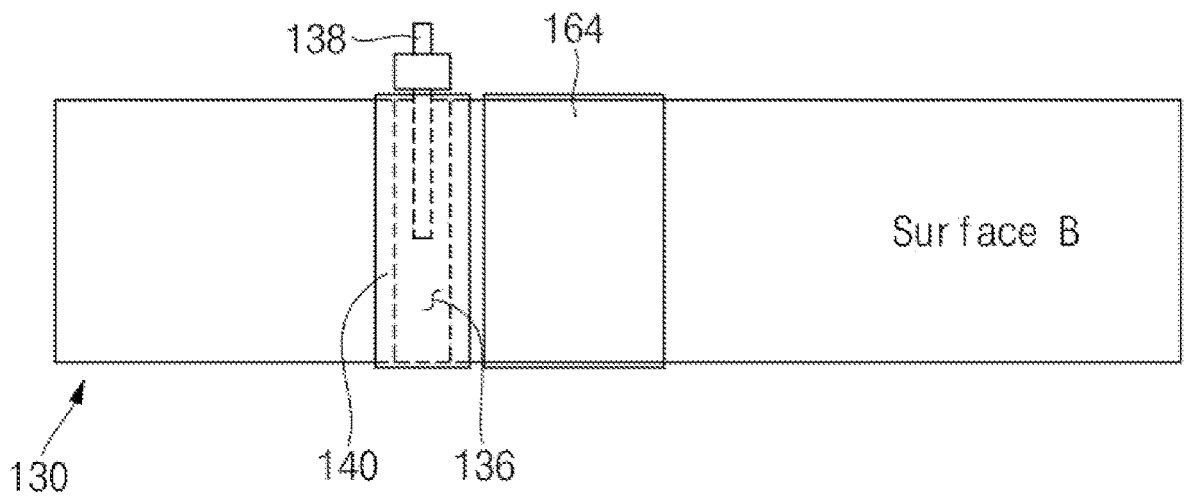

FIG. 4A is a plan view illustrating a surface A of a main component of the electrode assembly of FIG. 3. FIG. 4B is a plan view illustrating a surface B of a main component of the electrode assembly of FIG. 3 (the separator 120 between the first electrode plate and the second electrode plate will be omitted for convenience).

Figure 5:
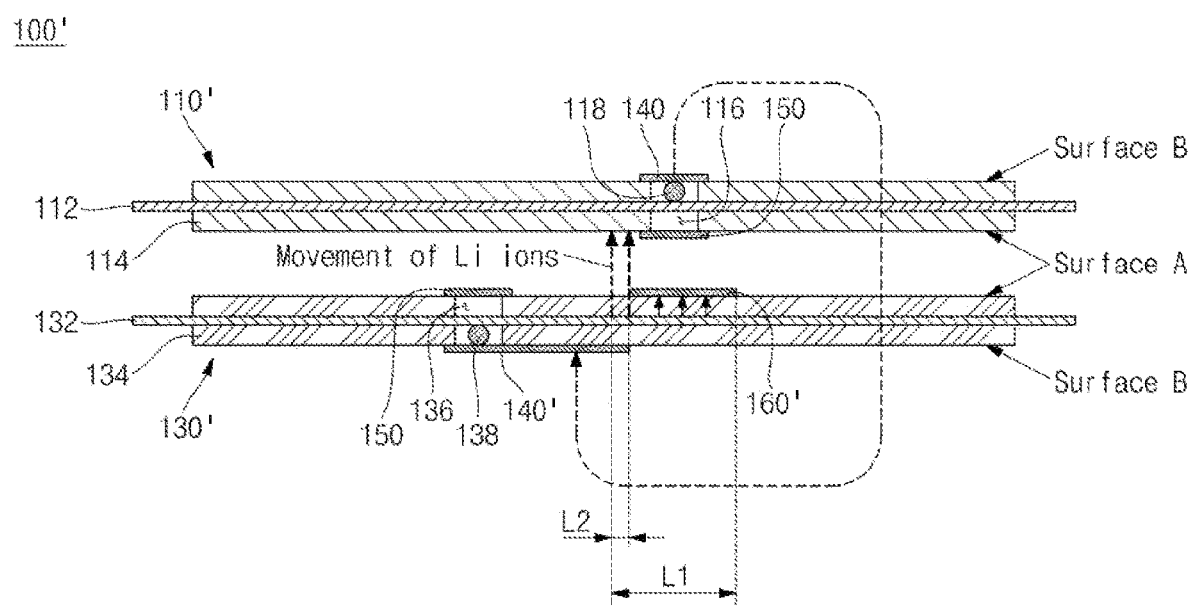
FIG. 5 is a schematic cross-sectional view of an electrode assembly according to a second embodiment of the present disclosure.

As illustrated in FIGS. 3 to 4B, the electrode assembly 100 according to an embodiment of the present disclosure may be wound after the separator 120 is disposed between the first electrode plate 110 that is a negative electrode and the second electrode plate 130 that is a positive electrode as shown in FIG. 5.

As illustrated in FIG. 3, the first electrode active material 114 may be applied to both surfaces of the first electrode collector 112 of the first electrode plate 110, and the first electrode uncoated portion 116 on which the first electrode active material 114 is not applied may be formed on a partial area thereof. The first electrode uncoated portion 116 is formed on both surfaces of the first electrode plate 110 in the same manner, and the first electrode base tab 118 is provided on one surface of the two surfaces. The first electrode uncoated portion 116 is formed on a portion facing the position of the first electrode base tab 118 to reduce a thickness of a portion on which the first electrode base tab 118 is formed.

As illustrated in FIGS. 3 to 4B, one surface of the first electrode plate 110, which faces the second electrode plate 130, is defined as a surface A, and the other surface of the first electrode plate 110, on which the first electrode base tab 118 is disposed is defined as a surface B. A tab cover tape 140 for covering the first electrode base tab 118 may be attached to the surface B of the first electrode uncoated portion 116, and an uncoated portion cover tape 150 for covering the first electrode uncoated portion 116 may be attached to the surface A.

Also, as illustrated in FIG. 3, the second electrode active material 134 may be applied to both surfaces of the second electrode collector 132 of the second electrode plate 130, and the second electrode uncoated portion 136 on which the second electrode active material 134 is not applied may be formed on a partial area thereof. Here, the second electrode uncoated portion 136 may be formed at a position that is not overlapped with the first electrode uncoated portion 116. The second electrode uncoated portion 136 is formed on both surfaces of the second electrode plate 130 in the same manner, and the second electrode base tab 138 is provided on one surface of the two surfaces. The second electrode uncoated portion 136 is formed on a portion facing the position of the second electrode base tab 138 to reduce a thickness of a portion on which the second electrode base tab 138 is formed.

As illustrated in FIGS. 3 to 4B, one surface of the second electrode plate 130, which faces the first electrode plate 110, is defined as a surface A, and the other surface of the second electrode plate 130, on which the second electrode base tab 138 is disposed is defined as a surface B. A tab cover tape 140 for covering the second electrode base tab 138 may be attached to the surface B of the second electrode uncoated portion 136, and an uncoated portion cover tape 150 for covering the second electrode uncoated portion 136 may be attached to the surface A.

Also, an insulating tape 160 may be additionally attached at a position corresponding to the position of the first electrode uncoated portion 116 on the surface A of the second electrode plate 130. Additionally, the insulating tape 160 may be additionally attached in the position corresponding to the tab cover tape 140 for covering the first electrode base tab 118 of the first electrode plate 110 on the surface B of the second electrode plate 130.

The tab cover tape 140 for covering the first electrode base tab 118 and the second electrode base tab 138 is, in some embodiments, an adhesion tape made of an insulating material for protecting and insulting the tab. The tab cover tape 140 may be made of a material such as polypropylene sulfide (PPS) and/or polyamide (PI), which has a strong thermal resistance and has little or no deformation such as shrinkage even at a high temperature. The tab cover tape 140 is formed to have a size suitable for (e.g., capable of) sufficiently covering the surface B of the first electrode uncoated portion 116 and the surface B of the second electrode uncoated portion 136.

The above-described uncoated portion cover tape 150 for covering the surface A of the first electrode uncoated portion 116 and the surface A of the second electrode uncoated portion 136 is also an adhesion tape made of an insulating material. The uncoated portion cover tape 150 may be made of a material that is the same as or similar to the tab cover tape 140. The uncoated portion cover tape 150 is formed to have a size suitable for (e.g., capable of) sufficiently covering the surface A of the first electrode uncoated portion 116 and the surface A of the second electrode uncoated portion 136.

As illustrated in FIGS. 3 to 4B, the insulating tape 160 is attached onto the second electrode plate 130 and attached on the surface A facing the first electrode plate 110. Also, the insulating tape 160 may be attached adjacent to the tab cover tape 140 of the second electrode plate 130. For convenience of description, the insulating tape 160 attached to the surface A is referred to as a first insulating tape 162, and the insulating tape 160 attached to the surface B is referred to as a second insulating tape 164.

The first insulating tape 162 is formed at a position corresponding to the uncoated portion cover tape 150 of the surface A of the first electrode plate 110 with the separator 120 therebetween. The first insulating tape 162 is formed to have a size suitable for (e.g., capable of) sufficiently covering the uncoated portion cover tape 150 of the first electrode plate 110. That is, the first insulating tape 162 is formed to have a size greater than that of each of the first electrode uncoated portion 116 and the uncoated portion cover tape 150 of the first electrode plate 110.

When the first insulating tape 162 is not provided, an area of the second electrode plate 130, which may affect (e.g., correspond to) the first electrode uncoated portion 116, may have a size (e.g., width) of L1 (hereinafter, referred to as an area L1, which corresponds to an area to which the first insulating tape 162 is attached in FIG. 4A). This area may be adjacent to the first electrode uncoated portion 116 and wider than the first electrode uncoated portion 116. When lithium ions are deposited on the area L1, the deposited lithium may be stacked (e.g., may grow into lithium dendrite) on a surface of each of the first electrode uncoated portion 116 and the first electrode active material 114 adjacent thereto, and may cover as large a size as the corresponding area.

However, with the above insight and/or reason, when the first insulating tape 162 is attached, the lithium deposition on the portion to which the insulating tape is attached may not occur, and thus the area L1 may be reduced to an area having a smaller size (e.g., width) of L2. Thus, the lithium deposition may be remarkably reduced, and the separator 120 may be prevented or substantially prevented from being punched (e.g., punctured or penetrated through) by the stack of the deposited lithium (e.g., by the lithium dendrite).

The second insulating tape 164 is formed at a position corresponding to the tab cover tape 140 of the first electrode plate 110 with the separator 120 therebetween when the electrode assembly 100 is wound (the position is indicated by a dotted arrow of FIG. 3 and a dotted arrow of FIG. 5). The second insulating tape 164 is formed to have a size suitable for (e.g., capable of) sufficiently covering the tab cover tape 140 of the first electrode plate 110. That is, the second insulating tape 164 is formed to have a size greater than that of each of the second electrode uncoated portion 136 and the tab cover tape 140 of the first electrode plate 110.

The second insulating tape 164 may be provided with the same insight and/or reason as the first insulating tape 162 to thus remarkably reduce the lithium deposition and prevent or substantially prevent the punch (e.g., puncture or penetrate through) of the separator 120 caused by the stack of the deposited lithium (e.g., by the lithium dendrite).

Although the attached position of the second insulating tape 164 is described above when the electrode assembly 100 is wound, this may be applied to even a stack-type (e.g., kind) electrode assembly in the same manner.

The second insulating tape having the above-described structure may be applied with a different structure as described below. Hereinafter, a description of the same structure as the first embodiment will be omitted (e.g., not repeated) for convenience of description, and only a different structure will be described.

Figure 6A:
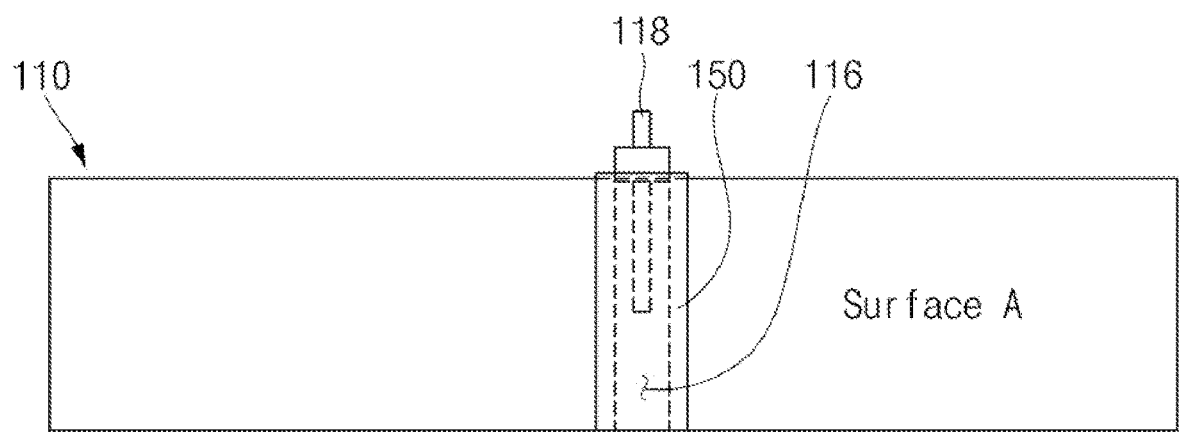
FIG. 6A is a plan view illustrating a surface A of a main component of the electrode assembly of FIG. 5.
Figure 6A:
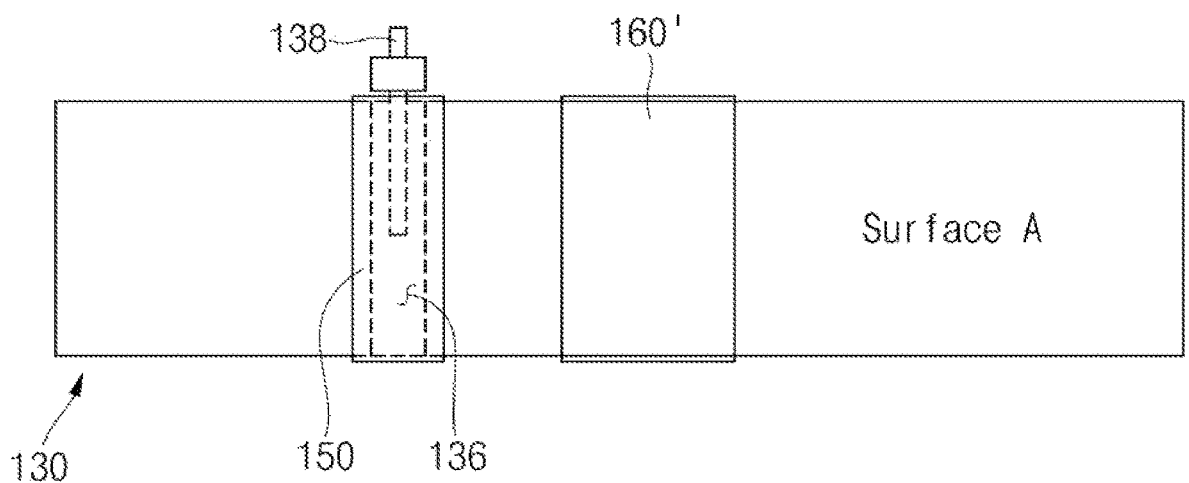
Figure 6B:
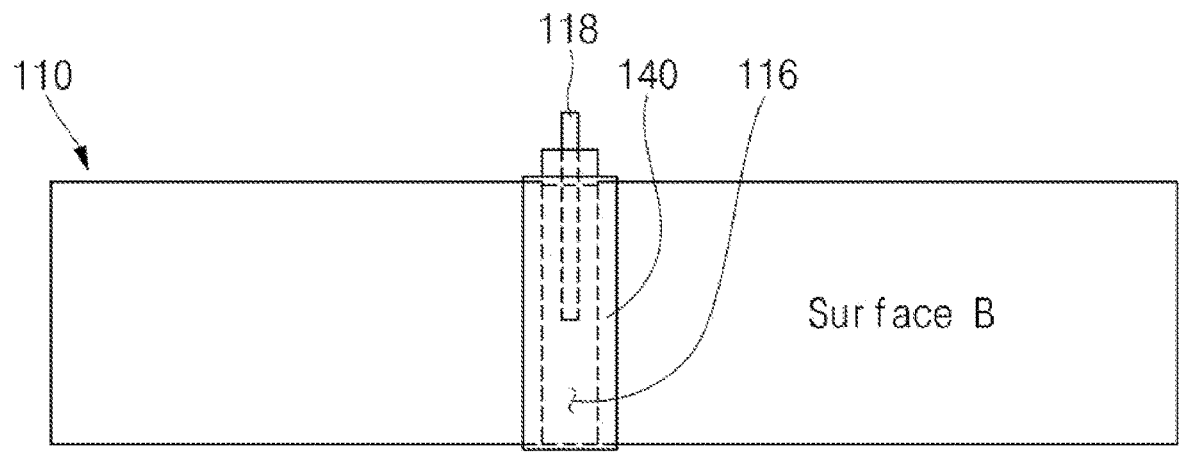
FIG. 6B is a plan view illustrating a surface B of a main component of the electrode assembly of FIG. 5.
Figure 6B:
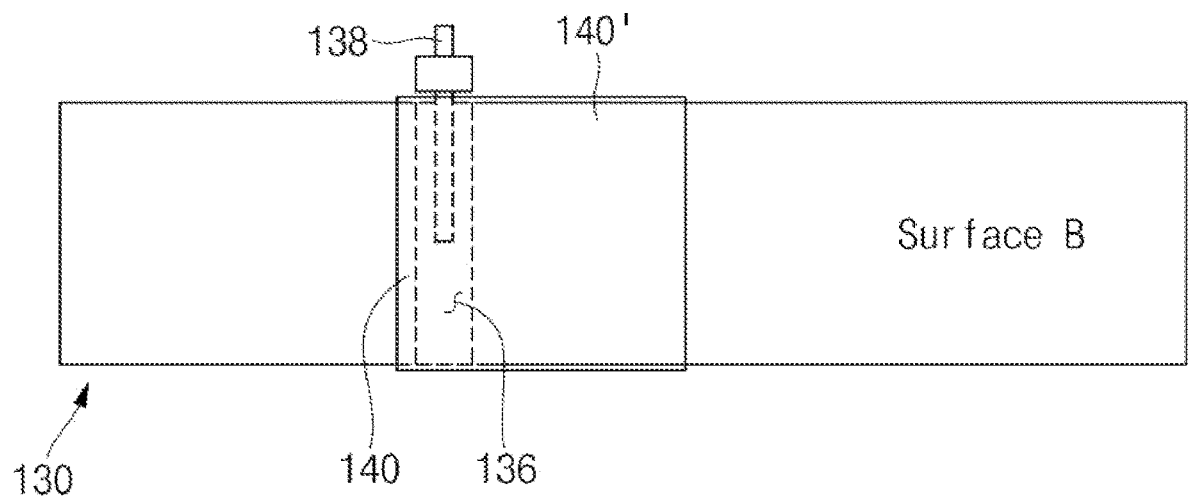

FIG. 5 is a schematic cross-sectional view of an electrode assembly according to a second embodiment of the present disclosure. FIG. 6A is a plan view illustrating surface A of a main component of the electrode assembly in FIG. 5. FIG. 6B is a plan view illustrating surface B of a main component of the electrode assembly of FIG. 5.

As illustrated in FIGS. 5 to 6B, an electrode assembly 100' according to the second embodiment of the present disclosure includes an insulating tape 160' attached to a second electrode plate 130 at a position corresponding to a first electrode uncoated portion 116. Also, a tab cover tape 140' may be expanded to include as large a size as that of the second insulating tape 164 for covering the second electrode base tab 138 and to serve as the second insulating tape 164 instead of the second insulating tape 164 of the first embodiment. That is, the insulating tape 160' is formed the same as the first insulating tape 162 of the first embodiment, and the tab cover tape 140' is formed to have a size sufficiently large to also cover the attached area of the second insulating tape 164 of the first embodiment. Although the tab cover tape 140' is expanded and provided without the additional second insulating tape 164, the same effect as the first embodiment may be obtained.

In some embodiments, an insulating tape having a different structure may be provided as described below. Hereinafter, a description of the same structure as the first embodiment will be omitted (e.g., not repeated) for convenience of description, and only a different structure will be described (the description that is omitted is because the structures of the insulating tape of the surface A and the surface B are the same as shown in FIGS. 6A and 6B).

Figure 7:
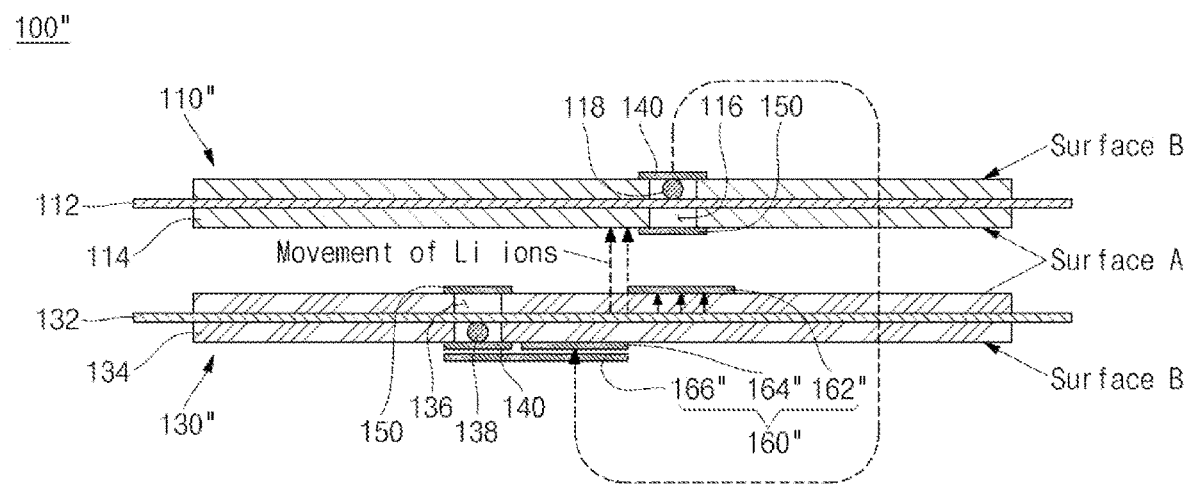
FIG. 7 is a schematic cross-sectional view of an electrode assembly according to a third embodiment of the present disclosure.

FIG. 7 is a schematic cross-sectional view of an electrode assembly according to a third embodiment of the present disclosure.

As illustrated in FIG. 7, an electrode assembly 100" according to the third embodiment of the present disclosure includes an insulating tape 160" including a first insulating tape 162" and a second insulating tape 164". Additionally, the electrode assembly 100" may include a third insulating tape 166" having a seize suitable for (e.g., capable of) sufficiently covering a tab cover tape 140 and the second insulating tape 164". That is, the third insulating tape 166" is attached onto the tab cover tape 140 and the second insulating tape 164" and additionally covers the tab cover tape 140 and the second insulating tape 164". Due to the above-described structure, an effect that is the same as or better than each of the first and second embodiments may be obtained.

According to the embodiment of the present disclosure, the deposition of the positive ions may be minimized or reduced by adding the insulating tape on the positive electrode plate corresponding to the uncoated portion of the negative electrode plate. Also, because the separator is prevented or substantially prevented from being punched (e.g., punctured or penetrated through) by the stacking of the deposited positive ions (e.g., formation of lithium dendrite), the short-circuit between the positive electrode and the negative electrode may be prevented or substantially prevented. Thus, the effect of improving the safety when the secondary battery is charged and discharged may be obtained.

The above-mentioned embodiments are merely examples of the secondary battery, and thus, the present disclosure is not limited to the foregoing embodiments, and also it will be understood by those of ordinary skill in the art that various changes in form and details may be made therein without departing from the spirit and scope of the present disclosure as defined by the following claims, and equivalents thereof.

What is claimed is:

1. A wound electrode assembly comprising:
a first electrode plate having a first electrode uncoated portion spaced apart from both ends in a longitudinal direction thereof, the first electrode uncoated portion has a first surface and a second surface facing away from the first surface, and a base tab on the first surface of the first electrode uncoated portion;
a second electrode plate having a second electrode coated portion coated with a second electrode active material and a second electrode uncoated portion spaced apart from both ends in a longitudinal direction thereof, the second electrode uncoated portion has a first surface and a second surface facing away from the first surface, and a base tab on the first surface of the second electrode uncoated portion;
a separator between the first electrode plate and the second electrode plate;
a tab cover tape attached to the first surface of each of the first electrode uncoated portion and the second electrode uncoated portion;
an uncoated portion cover tape attached to the second surface of each of the first electrode uncoated portion and the second electrode uncoated portion; and
an insulating tape attached onto the second electrode plate at a position aligned with the first electrode uncoated portion, the insulating tape comprising a first insulating tape directly attached onto only the second electrode active material,
wherein the first insulating tape is greater in size than the first electrode uncoated portion along the longitudinal direction of the first electrode plate.

2. The wound electrode assembly of claim 1, wherein the first electrode plate is a negative electrode, and the second electrode plate is a positive electrode.

3. The wound electrode assembly of claim 2, wherein the insulating tape comprises the first insulating tape attached at a position aligned with the second surface of the first electrode uncoated portion and a second insulating tape attached at a position aligned with the first surface of the first electrode uncoated portion, on which the base tab is formed.

4. The wound electrode assembly of claim 3, wherein the second insulating tape is greater in size than the first electrode uncoated portion.

5. The wound electrode assembly of claim 2, wherein
the first insulating tape is attached at a position aligned with the second surface of the first electrode uncoated portion, and
the tab cover tape attached to the first surface of the second electrode uncoated portion extends over and is attached at a position aligned with the first surface of the first electrode uncoated portion, on which the base tab is formed.

6. The wound electrode assembly of claim 2, wherein the insulating tape comprises:
the first insulating tape attached at a position aligned with the second surface of the first electrode uncoated portion,
a second insulating tape attached at a position aligned with the first surface of the first electrode uncoated portion, on which the base tab is formed, and
a third insulating tape attached to cover the second insulating tape and the tab cover tape attached to the first surface of the second electrode uncoated portion.

7. A secondary battery comprising:
a wound electrode assembly comprising:
a first electrode plate having a first electrode uncoated portion spaced apart from both ends in a longitudinal direction thereof, the first electrode uncoated portion has a first surface and a second surface facing away from the first surface, and a base tab on the first surface of the first electrode uncoated portion;
a second electrode plate having a second electrode coated portion coated with a second electrode active material and a second electrode uncoated portion spaced apart from both ends thereof in a longitudinal direction, the second electrode uncoated portion has a first surface and a second surface facing away from the first surface, and a base tab on the first surface of the second electrode uncoated portion;
a separator between the first electrode plate and the second electrode plate;
a tab cover tape attached to the first surface of each of the first electrode uncoated portion and the second electrode uncoated portion;

an uncoated portion cover tape attached to the second surface of each of the first electrode uncoated portion and the second electrode uncoated portion; and an insulating tape attached onto the second electrode plate at a position aligned with the first electrode uncoated portion, the insulating tape comprising a first insulating tape directly attached onto only the second electrode active material; and a pouch or pocket kind case configured to accommodate and seal the electrode assembly together with an electrolyte, wherein the first insulating tape is greater in size than the first electrode uncoated portion along the longitudinal direction of the first electrode plate.

8. The secondary battery of claim 7, wherein the first electrode plate is a negative electrode, and the second electrode plate is a positive electrode.

9. The secondary battery of claim 8, wherein the insulating tape comprises the first insulating tape attached at a position aligned with the second surface of the first electrode uncoated portion and a second insulating tape attached at a position aligned with the first surface of the first electrode uncoated portion, on which the base tab is formed.

10. The secondary battery of claim 9, wherein the second insulating tape is greater in size than the first electrode uncoated portion.

11. The secondary battery of claim 8, wherein
the first insulating tape is attached at a position aligned with the second surface of the first electrode uncoated portion, and
the tab cover tape attached to the first surface of the second electrode uncoated portion extends over and is attached at a position aligned with the first surface of the first electrode uncoated portion, on which the base tab is formed.

12. The secondary battery of claim 8, wherein the insulating tape comprises:
the first insulating tape attached at a position aligned with the second surface of the first electrode uncoated portion,
a second insulating tape attached at a position aligned with the first surface of the first electrode uncoated portion, on which the base tab is formed, and
a third insulating tape attached to cover the second insulating tape and the tab cover tape attached to the first surface of the second electrode uncoated portion.

13. The wound electrode assembly of claim 1, wherein the insulating tape comprises the first insulating tape attached on the second surface of the second electrode active material and spaced apart from the second electrode uncoated portion.

14. The wound electrode assembly of claim 7, wherein the insulating tape comprises the first insulating tape attached on the second surface of the second electrode active material and spaced apart from the second electrode uncoated portion.

15. The wound electrode assembly of claim 1, wherein
the first insulating tape is attached at a position aligned with the second surface of the first electrode uncoated portion,
the tab cover tape attached to the first surface of the second electrode uncoated portion extends over and is attached at a position aligned with the first surface of the first electrode uncoated portion, on which the base tab is formed, and
the first insulating tape does not cover the tab cover tape.

16. The wound electrode assembly of claim 7, wherein
the first insulating tape is attached at a position aligned with the second surface of the first electrode uncoated portion,
the tab cover tape attached to the first surface of the second electrode uncoated portion extends over and is attached at a position aligned with the first surface of the first electrode uncoated portion, on which the base tab is formed, and
the first insulating tape does not cover the tab cover tape.

17. The wound electrode assembly of claim 1, wherein
the first insulating tape is attached at a position aligned with the second surface of the first electrode uncoated portion,
the tab cover tape attached to the first surface of the second electrode uncoated portion extends over and is attached at a position aligned with the first surface of the first electrode uncoated portion, on which the base tab is formed, and
the first insulating tape is between the tab cover tape and an end of the second electrode plate along the longitudinal direction of the second electrode plate.

18. The wound electrode assembly of claim 7, wherein
the first insulating tape is attached at a position aligned with the second surface of the first electrode uncoated portion,
the tab cover tape attached to the first surface of the second electrode uncoated portion extends over and is attached at a position aligned with the first surface of the first electrode uncoated portion, on which the base tab is formed, and
the first insulating tape is between the tab cover tape and an end of the second electrode plate along the longitudinal direction of the second electrode plate.

* * * * *